United States Patent
Mendel

(10) Patent No.: US 11,775,691 B2
(45) Date of Patent: Oct. 3, 2023

(54) DATA PROCESSING DEVICE AND METHOD FOR PROCESSING SECRET DATA

(71) Applicant: Infineon Technologies AG, Neubiberg (DE)

(72) Inventor: Florian Mendel, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 298 days.

(21) Appl. No.: 17/136,044

(22) Filed: Dec. 29, 2020

(65) Prior Publication Data
US 2021/0240861 A1 Aug. 5, 2021

(30) Foreign Application Priority Data
Feb. 4, 2020 (DE) .................. 10 2020 102 796.6

(51) Int. Cl.
*G06F 21/72* (2013.01)
*G06F 21/60* (2013.01)
*G06F 9/30* (2018.01)

(52) U.S. Cl.
CPC .......... *G06F 21/72* (2013.01); *G06F 9/30029* (2013.01); *G06F 9/30101* (2013.01); *G06F 21/602* (2013.01); *G06F 2221/0755* (2013.01)

(58) Field of Classification Search
CPC .... G06F 21/602; G06F 21/6209; G06F 21/72; G06F 2221/0755; G06F 2221/2107; G06F 9/30029; G06F 9/30101; H04L 9/003; H04L 2209/04; H04L 2209/046
See application file for complete search history.

(56) References Cited

U.S. PATENT DOCUMENTS

| | | | |
|---|---|---|---|
| 4,903,228 A | 2/1990 | Gregoire et al. | |
| 9,703,633 B2 | 7/2017 | Zhang et al. | |
| 10,505,711 B2 | 12/2019 | Eshard | |
| 2006/0256963 A1* | 11/2006 | Gebotys | H04L 9/003 380/205 |
| 2015/0169904 A1* | 6/2015 | Leiserson | G06F 21/71 713/189 |
| 2019/0296898 A1* | 9/2019 | De Mulder | H04L 9/085 |

OTHER PUBLICATIONS

Mulder et al., Identifying and Eliminating Side-channel Leaks in Programmable Systems, IEEE, 2017.*
Prouff et al., Masking against Side-Channel Attacks: A Formal Security Proof, 2013.*

* cited by examiner

*Primary Examiner* — Minh Dinh
(74) *Attorney, Agent, or Firm* — VIERING, JENTSCHURA & PARTNER MBB

(57) ABSTRACT

A data processing device may include a processor, configured to combine a first data word and a second data word of a plurality of secret data words by storing, for each of the first data word and the second data word, for an Exclusive-Or sharing of the data word into multiple partial representatives, for at least one of the partial representatives, a transformed version of the partial representative in a processor register, and, if the combination of the data words requires a partial representative of the first data word to be combined with a partial representative of the second data word that is stored in a processor register after having been transformed, combining the partial representative of the first data word with the partial representative of the second data word with a processor operation that takes into consideration that the partial representative of the second data word has been transformed.

20 Claims, 5 Drawing Sheets

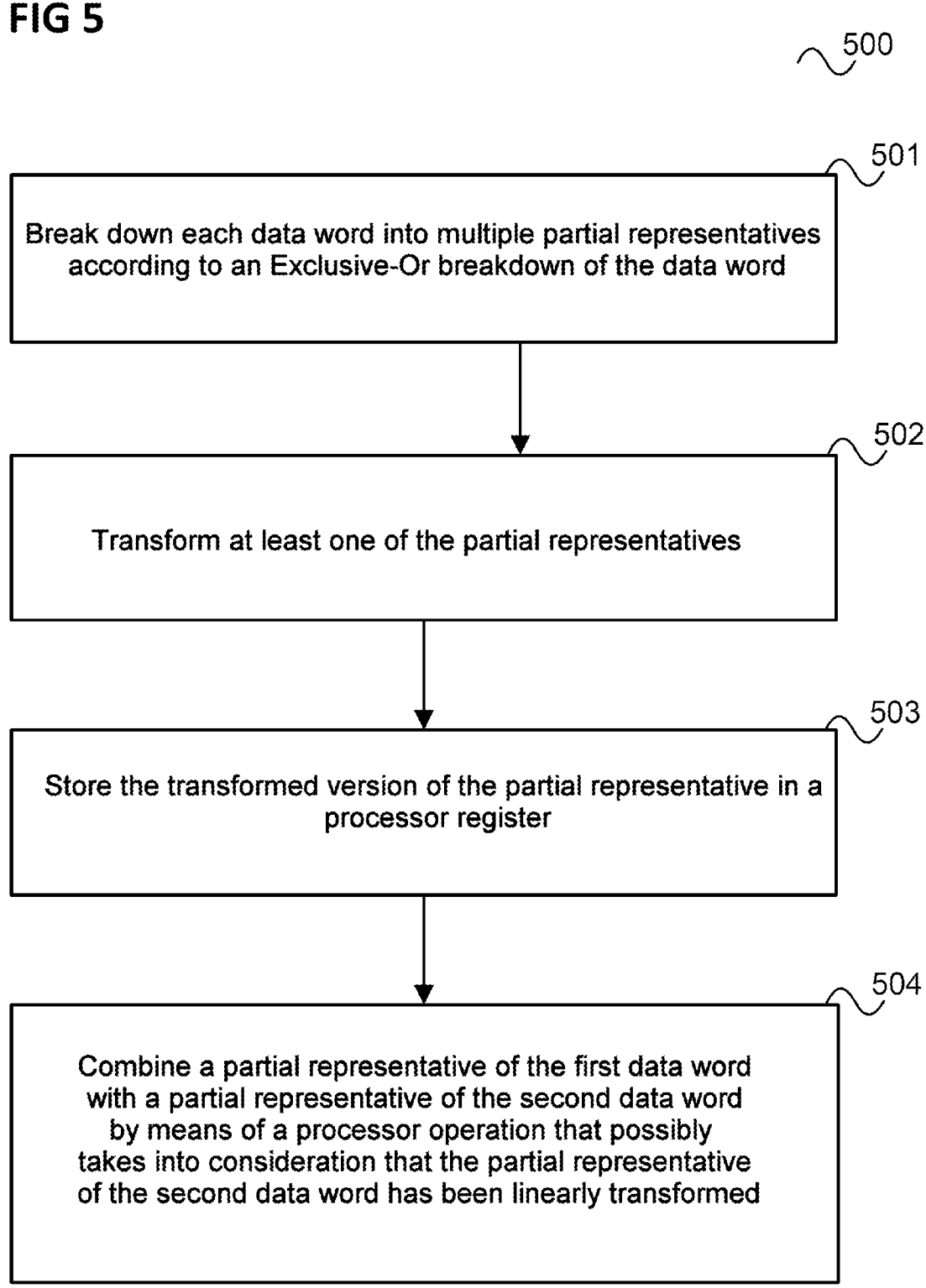

DATA PROCESSING DEVICE AND METHOD FOR PROCESSING SECRET DATA

CROSS-REFERENCE TO RELATED APPLICATION

This non-provisional application claims priority to German application No. 10 2020 102 796.6 filed on Feb. 4, 2020, the entire contents of which are incorporated herein by reference.

TECHNICAL FIELD

Exemplary embodiments relate in general to data processing devices and a method for processing secret data.

BACKGROUND

In the course of security-relevant applications, computer chips, such as for example on a chip card or in a control device in a vehicle, typically perform cryptographic operations for encryption, decryption and authentication, etc. These involve data being processed, such as for example cryptographic keys, that are supposed to be protected against access by an attacker (e.g using side channel attacks). A typical security mechanism is the masking of data to be processed that have data words broken down into multiple partial representatives by an Exclusive-Or sharing. However, during the processing the case can arise in which an attacker can extract information about partial representatives of a partial word and hence about the data word itself using a side channel attack. This occurs for example if a partial representative in a register is replaced by another partial representative.

Approaches are therefore desirable that increase the security of secret data processed by a processor with little overhead.

BRIEF SUMMARY

According to an exemplary embodiment, a data processing device is provided that has a memory, which is configured to store secret data that include a plurality of secret data words, and a processor, which is configured to combine a first data word and a second data word of the plurality of secret data words by, for each of the first data word and the second data word, for an Exclusive-Or sharing of the data word into multiple partial representatives, storing, for at least one of the partial representatives, a transformed version of the partial representative in a processor register, and, if the combination of the first data word with the second data word requires a partial representative of the first data word to be combined with a partial representative of the second data word that is stored in a processor register after having been transformed, combining the partial representative of the first data word with the partial representative of the second data word by means of a processor operation that takes into consideration that the partial representative of the second data word has been transformed.

BRIEF DESCRIPTION OF THE FIGURES

The figures do not reproduce the actual size ratios but rather are intended to serve to illustrate the principles of the various exemplary embodiments. Various exemplary embodiments are described below with reference to the figures that follow.

FIG. 5 shows a flowchart illustrating a method for processing secret data according to an embodiment.

DETAILED DESCRIPTION

The detailed description that follows relates to the accompanying figures, which show details and exemplary embodiments. These exemplary embodiments are described in such detail that a person skilled in the art is able to implement the invention. Other embodiments are also possible and the exemplary embodiments can be changed in structural, logical and electrical respects without departing from the subject matter of the invention. The various exemplary embodiments are not necessarily mutually exclusive but rather it is possible for various embodiments to be combined with one another, so that new embodiments are produced. Within the scope of this description, the terms "connected" and "coupled" are used to describe both a direct and an indirect connection and also a direct or indirect coupling.

Figure 1:
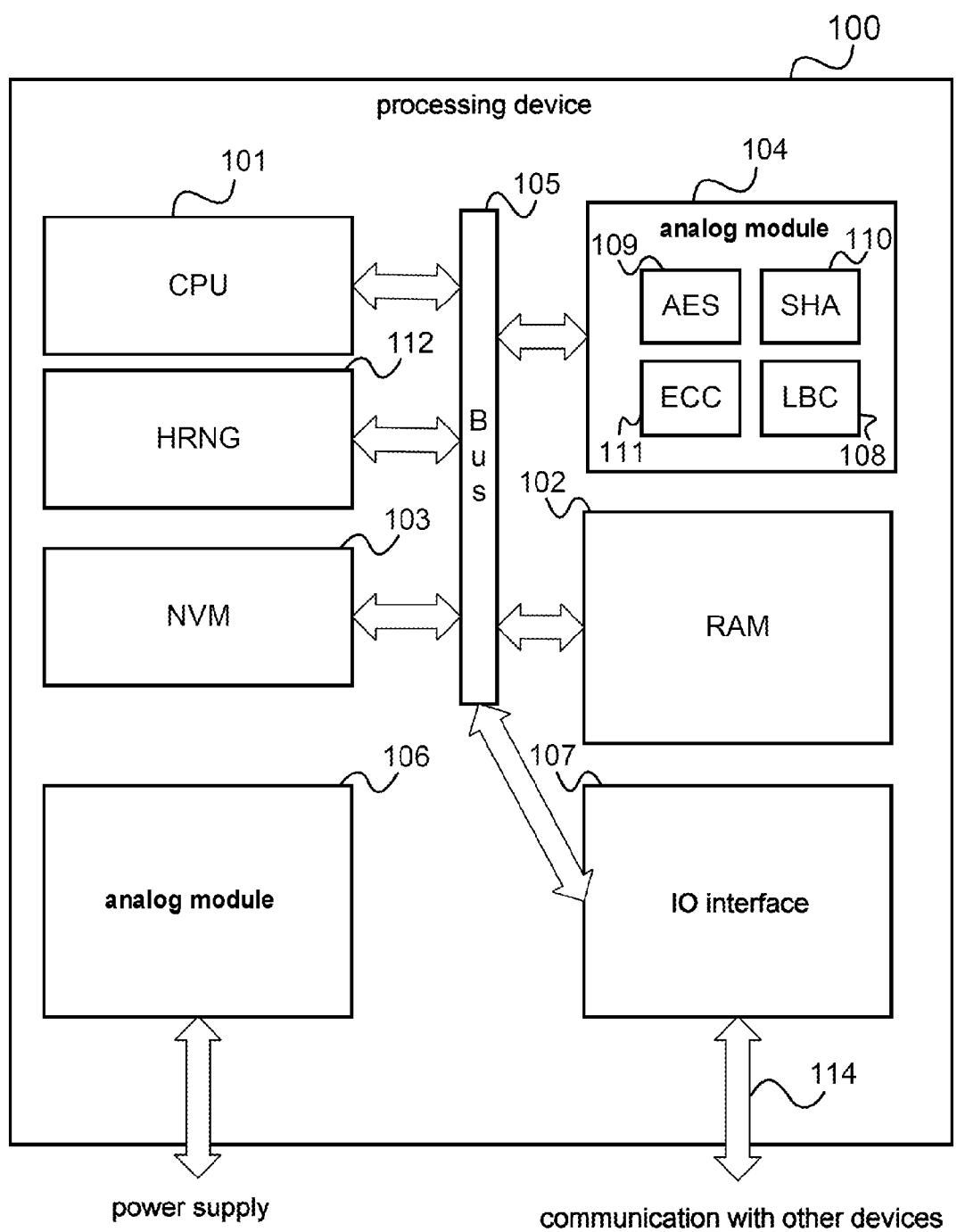
FIG. 1 shows an example of a processing device for performing cryptographic operations.

FIG. 1 shows an example of a processing device for performing cryptographic operations.

FIG. 1 shows an example of a processing device 100 having a CPU (central processing unit, i.e. a main processor) 101, a RAM (random access memory) 102, a non-volatile memory 103 (NVM), a crypto module 104, an analog module 106, an input/output interface 107 and a (e.g. hardware) random number generator 112.

In this example, the CPU 101 has access to at least one crypto module 104 via a common bus 105 to which each crypto module 104 is connected. Each crypto module 104 can include in particular one or more crypto cores, in order to perform specific cryptographic operations. Exemplary crypto cores are:

an AES core 109,
an SHA core 110,
an ECC core 111, and
a lattice-based crypto (LBC) core 108.

The lattice-based crypto core 108 may be provided in order to speed up lattice-based cryptography.

The CPU 101, the hardware random number generator 112, the NVM 103, the crypto module 104, the RAM 102 and the input/output interface 107 are connected to the bus 105. The input/output interface 107 can have a connection 114 to other devices similarly to the processing device 100.

The analog module 106 is supplied with electric power via an electrical contact and/or via an electromagnetic field. This power is supplied in order to drive the circuit of the processing device 100, and can in particular allow the input/output interface to use the connection 114 to initiate and/or maintain connections to other devices.

The bus 105 itself may be masked or simple. Instructions for executing the processing and the algorithms, which are described below, can be stored in particular in the NVM 103 and processed by the CPU 101. The processed data can be stored in the NVM 103 or in the RAM 102. Random numbers are delivered by the hardware random number generator 112.

Cryptographic operations can be executed exclusively or at least in part on the crypto module 104. They can alternatively be performed by the CPU 101, and a dedicated crypto module 104 can be dispensed with.

The components of the processing device 100 may be implemented on a single chip, for example. The processing device 100 may be a chip card (or a chip card module) that is supplied with power by means of direct electrical contact or by an electromagnetic field. The processing device 100 may be a fixed circuit or be based on reconfigurable hardware (e.g. field programmable gate array, FPGA). The processing device 100 may be connected to a personal computer, microcontroller, FPGA or a smartphone system on a chip (SoC) or to other components of a smartphone. The processing device 100 may be a chip that acts as a trusted platform module (TPM) and provides cryptographic functionality according to a standardized interface to a computer, smartphone, Internet of things (IoT) device or vehicle. The processing device 100 may alternatively itself be a separate data processing device, e.g. a personal computer, a smartphone etc.

The performance of cryptographic operations such as decrypting encrypted data or signing data typically involves secret data such as a cryptographic key being used. In order to ensure security, it is necessary to prevent an attacker from being able to obtain information about such secret data, for example using a side channel attack. A typical approach to protecting against side channel attacks is masking of secret data, as depicted in FIG. 2.

Figure 2:
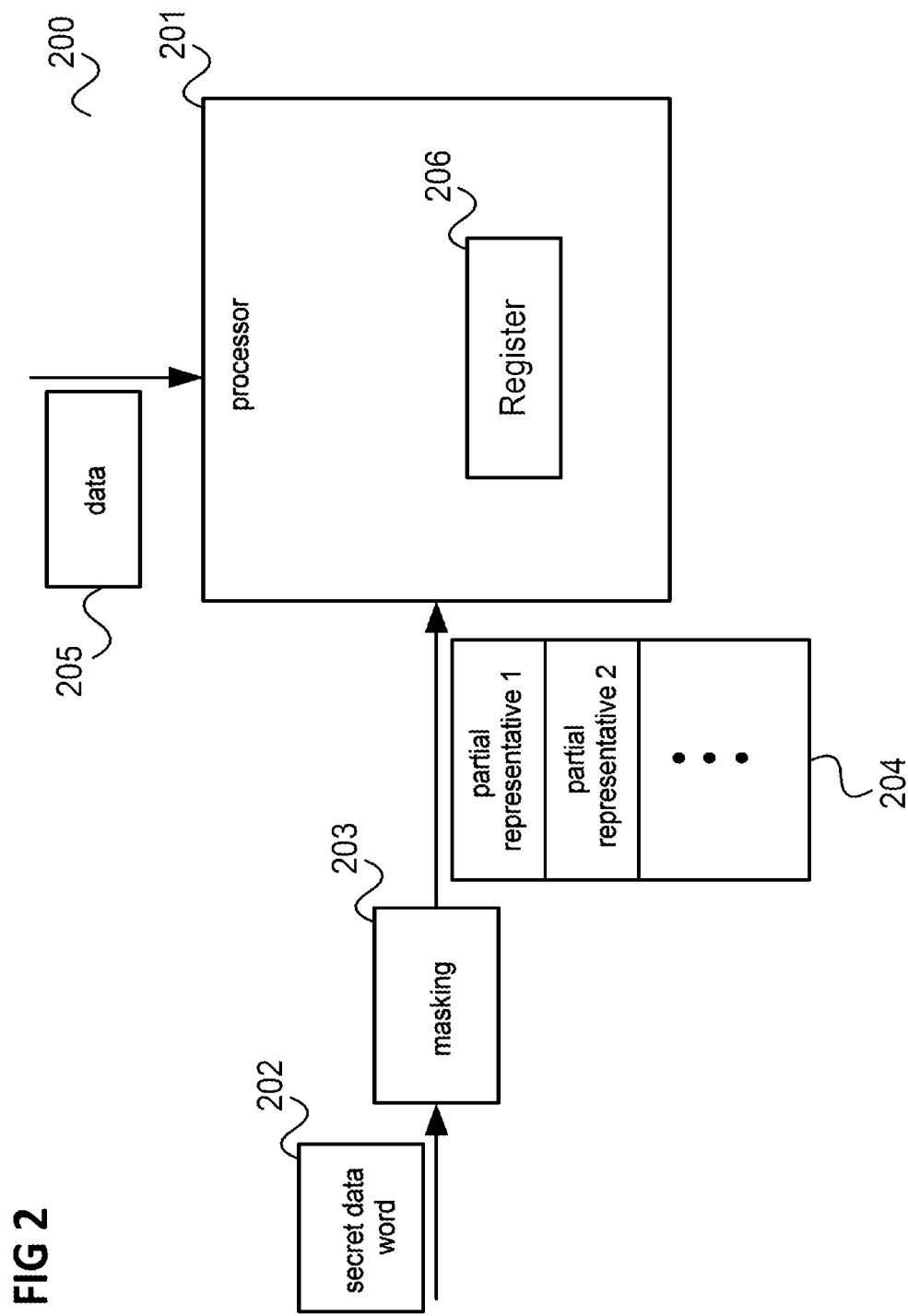
FIG. 2 shows a data processing arrangement.

FIG. 2 shows a data processing arrangement 200.

The data processing arrangement 200 has a processor 201. The processor corresponds to the CPU 101 or the crypto module 104, for example.

A secret data word 202, e.g. a word of a cryptographic key, is masked by a masking block 203. The secret data word 202 can be generated e.g. by a key generator or may be previously stored in a memory (e.g. in the NVM 103).

The masking can be performed in the processor itself, i.e. the masking block 203 can be implemented by the processor 201 itself. It can also be performed beforehand, so that the secret data are present in the memory (e.g. in the NVM 103 or RAM 102) after already having been masked (i.e. broken down into multiple partial representatives) or there may even be a circuit between the memory and the processor that performs the masking.

The masking block 203 breaks down the secret data word 202 into multiple partial representatives 204, which the processor 201 then uses for computation, i.e. to perform a cryptographic operation, e.g. a decryption or signing of further data 205 to be cryptographically processed, which are not secret, for example, or else a method for generating a symmetric key, e.g. for a communication session.

By way of example, the secret data word 202 is broken down into two partial representatives. In this regard, let x be a binary representation of the secret data word 202 with a specific word length (e.g. 32 bits). The masking block 203 randomly selects a partial representative $x_1$ (i.e. $x_1$ is the value of a random variable, e.g. generated using the random number generator 112).

The masking block 203 then produces the second partial representatives $x_2$ according to $$x_2 = x \oplus x_1$$

where $\oplus$ denotes the Exclusive-Or combination (also called XOR combination below).

Thus, $x = x_1 \oplus x_2$ and hence x is represented as a pair $(x_1, x_2)$, which is written as $$x \sim (x_1, x_2)$$

below.

The processor 201 can then use such representations for computation, in order to avoid leaking information about secret data words.

If for example two secret data words $x \sim (x_1, x_2)$ and $y \sim (y_1, y_2)$ are intended to be combined by means of an Exclusive-Or combination, then the following applies for the result $$x \oplus y \sim (x_1 \oplus y_1, x_2 \oplus y_2).$$

The processor 201 can thus directly calculate the representation (i.e. the masked version) of the result, without calculating x and y in non-broken-down (i.e. unmasked) form, which would be a security risk.

As a further example, the following relationship applies for an And function combining $x \sim (x_1, x_2)$ and $y \sim (y_1, y_2)$:

$$x \wedge y \sim (r \oplus (x_1 \wedge y_1) \oplus (x_1 \wedge y_2), r \oplus (x_2 \wedge y_1) \oplus (x_2 \wedge y_2)).$$

In this case too the processor 201 can thus directly calculate the representation of the result. In this instance, r is a random word (e.g. generated by using the random number generator 112). It is used in order to ensure an even distribution of the bits of the partial representatives of the result, since otherwise an attacker could in turn obtain information about the secret data words x and y from the result. The above is merely an example of how an And function can be masked. There are other possibilities, and embodiments are not limited to the example above.

The above-described sharing of a secret data word into two partial representatives is referred to as first-order Boolean masking. Such first-order masking can be breached by a second-order attack (e.g by a combination of multiple measurement times). Higher-order masking can be performed by means of breakdown into more than two partial representations. However, the complexity (computational complexity and length of the required program code) increases considerably with the number of partial representations. For a breakdown into n partial representations, the masked calculation of an And combination (as indicated above for the case n=2) requires $O(n^2)$ operations, for example.

It is therefore desirable to keep down the number of partial representatives. For example, instead of changing to higher-order masking, first-order masking is often used in combination with other measures (such as dummy operations) in order to counter higher-order attacks.

Masking as described above can also result in a collision in the hardware, however, where information about a secret data word is output (also referred to as "leaking" information).

This information is included in a power consumption of the processor 201 during a specific operation, for example, and can be extracted by an attacker by means of appropriate measurements. One example is that the two partial representatives $x_1$ and $x_2$ are stored in a register of the processor 204 in succession. If, as a simple example, $x_1$ and $x_2$ consist of only one bit, then an attacker is able to determine, by observing the power consumption of the change of $x_1$ and $x_2$, whether $x_1$ and $x_2$ are equal (no charge reversal required) or different (charge reversal required), since the power consumption in both cases is different on the basis of the charge reversal that is required or not required. With longer word lengths, this extraction of information is more complicated but also possible.

In practice, these are typically a few bits (between 2.8 and 32 bits for a 32-bit word) in the case of such a leak by hardware.

This leak can occur when two partial representatives are processed by the processor 201 in succession. It can also occur when partial representatives are moved between registers (or else the register and a cache or RANI). Even if a programmer ensures that his code does not involve partial representatives being stored in the same register 206 in succession, the processor architecture may mean that there are registers in the processor that are invisible from the point of view of the programming and result in such a leak of information occurring. One example of this is a register used specifically for push operations. The leak can also occur as a result of errors (glitches) when registers are switched (register file select).

According to various embodiments, at least one partial representative is stored in a transformed form as a measure against such leaking of information. An exemplary embodiment is described below with reference to FIG. 3.

Figure 3:
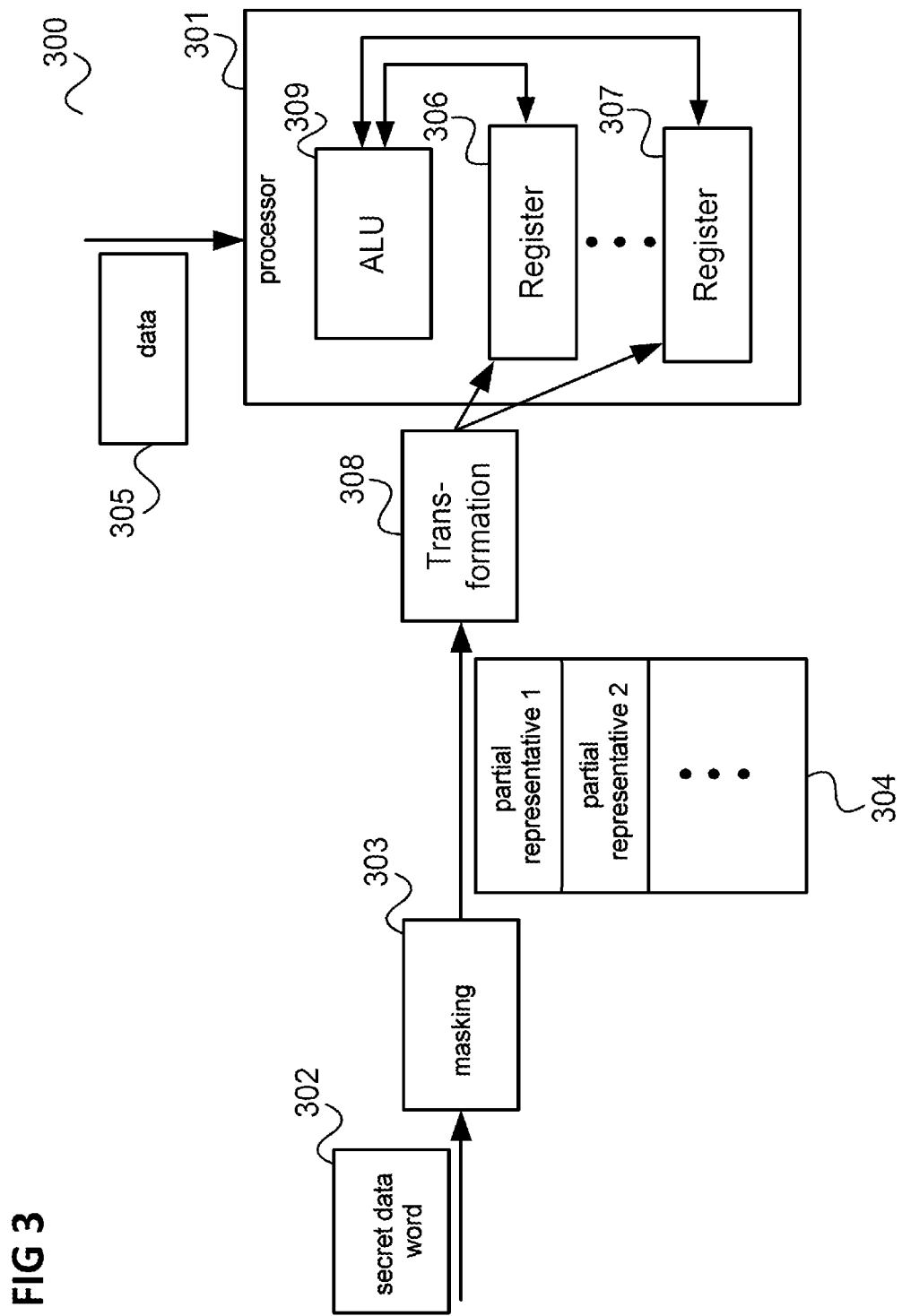
FIG. 3 shows a data processing arrangement according to an exemplary embodiment.

FIG. 3 shows a data processing arrangement 300 according to an exemplary embodiment.

Analogously to the data processing arrangement 200, the data processing arrangement 300 has a processor 301, which is intended to use a secret data word 302 to process further data 305 to be cryptographically processed, and a masking block 303, which breaks down the secret data word 302 into multiple partial representatives 304 that the processor 304 uses for computation. In this regard, the partial representatives 304 are stored in registers 306, 307.

At least one of the partial representatives 304 is transformed by a transformation block 308, however, before being stored in a register 308.

Like the masking, the transformation can be performed in the processor itself, i.e. the transformation block 308 can be implemented by the processor 303 itself. It can also be performed beforehand, so that this partial representative is present in the memory (e.g. in the NVM 103 or RANI 102) after already having been transformed or there may even be a circuit between the memory and the processor that performs the transformation (e.g. a circuit that also performs the masking, i.e. the breakdown into multiple partial representatives).

For a representation that the masking block 303 generates for a secret data word, for example the first partial representative is transformed and the transformed version is stored in a first register 306, and a second partial representative is stored in untransformed form in a second register 307.

The resulting breakdown into multiple partial representatives (with transformation of the first partial representative) is denoted by $x \sim (x_1, x_2)$, as in the example above.

The transformation is for example a rotation to the right, so that the secret data word x is represented as $x=(x_1 \lll s) \oplus x_2$, where $\lll$ denotes a rotation through s bits to the left. This means that the masking block 303 produces a representation $x = x'_1 \oplus x_2$ and the transformation block 304 then sets $x_1 = x'_1 \ggg s$ (that is to say applies a right-hand rotation to the first partial representative), so that $x = x'_1 \oplus x_2 = (x_1 \lll s) \oplus x_2$.

Instead of a rotation, it is also possible for any other bit permutation to be used. Herewith a few examples of a 32-bit permutation and the inverse thereof:

$$\pi(i)=5*i+1 \bmod 32, \pi^{-1}(i)=13*i+31 \bmod 32$$

$$\pi(i)=9*i+1 \bmod 32, \pi^{-1}(i)=25*i+31 \bmod 32$$

$$\pi(i)=17*i+1 \bmod 32, \pi^{-1}(i)=17*i+31 \bmod 32$$

Alternatively, the masking block 303 and the transformation block 304 may also be combined into one block that selects $x_1$ at random and selects $x_2$ according to $x_2 = x \oplus (x_1 \lll s)$. This is accordingly possible for any other transformation.

Rotation allows the leak in the event of a collision between the two partial representatives to be reduced. The number of bits s through which rotation takes place is chosen, according to one embodiment, to be coprime to the word length, that is to say e.g. $GCD(32, s) = 1$, where GCD denotes the greatest common devisor. This further reduces the leak of information. It can be shown that such a rotation results in just one bit being leaked (namely the parity of x) in practice, both from an information theory point of view and as a result of hardware leakage. The same also applies to any bit permutation with a full cycle length, such as the bit permutations in the examples above.

In the example above, the first partial representative is transformed. It is analogously also possible for the second partial representative to be transformed, or else multiple partial representatives (in particular in the case of a breakdown into more than two partial representatives).

The example above with two partial representatives and rotation as transformation is used below to describe how the processor 301 can use these representations for computation (without first having to transform back the transformed partial representative). By way of example, the processor 301 has an ALU (algorithmic logic unit) 308, which receives and logically combines (possibly transformed) partial representatives from the registers 306, 307 (and stores results in the registers 306, 307 again).

If for example two secret data words $x \sim (x_1, x_2)$ and $y \sim (y_1, y_2)$ are supposed to be combined by means of an Exclusive-Or combination, then the following applies for the result $x \oplus y \sim (x_1 \oplus y_1, x_2 \oplus y_2)$. This can thus take place without rotation just as in the case described above.

The following relationship applies for an And function combining $x \sim (x_1, x_2)$ and $y \sim (y_1, y_2)$ (where $x = (x_1 \lll s) \oplus x_2$ and $y = (y_1 \lll s) \oplus y_2$):

$$x \wedge y \sim ((r \ggg s) \oplus (x_1 \wedge y_1) \oplus (x_1 \wedge (y_2 \ggg s)), r \oplus (x_2 \wedge (y_1 \lll s)) \oplus (x_2 \wedge y_2))$$

In this case too the processor 301 can thus directly calculate the representation of the result. As above, in this instance, r is a random word (e.g. generated by using the random number generator 112). The above is merely an example of how an And function can be masked. There are other possibilities, and embodiments are not limited to the example above.

According to various embodiments, processor operations of the processor 301 (e.g. the ALU 309) are used that permit the back rotation as part of the processing by the processor operation on an operand, so that the operand does not first have to be rotated back in a register (which would again result in the risk of leaks of information). Examples of processor operations that permit this are the basic operations of an ARM (Advanced RISC (Reduced Instruction Set Computer) Machines) processor such as AND (logic And), ORR (logic Or), BIC (logic And with inversion of the second operand), ORC (logic Or with inversion of the second operand), etc. It is alternatively possible for other processors to be used that support such processor operations, or else a processor can be designed such that it supports process operations that are atomic and include a back transformation.

An implementation (e.g. on an ARM processor) of the formula shown above for the And function (with a rotated first partial representative of the two inputs x and y) is indicated in pseudocode below:

Input: $(x_1, x_2)$, $(y_1, y_2)$, r
  $t \leftarrow x_1 \wedge y_1$
  $t \leftarrow t \oplus (r >> s)$
  $z_1 \leftarrow x_1 \wedge (y_2 << s)$
  $z_1 \leftarrow z_1 \oplus r$
  $t \leftarrow x_2 \wedge y_2$
  $t \leftarrow t \oplus r$
  $z_2 \leftarrow x_2 \wedge (y_1 << s)$
  $z_2 \leftarrow z_2 \oplus t$
Output: $(z_1, z_2)$ This implementation avoids in particular two instructions that process partial representatives of x and y being successive. Generation of the random value r and eight operations are required.

Figure 4:
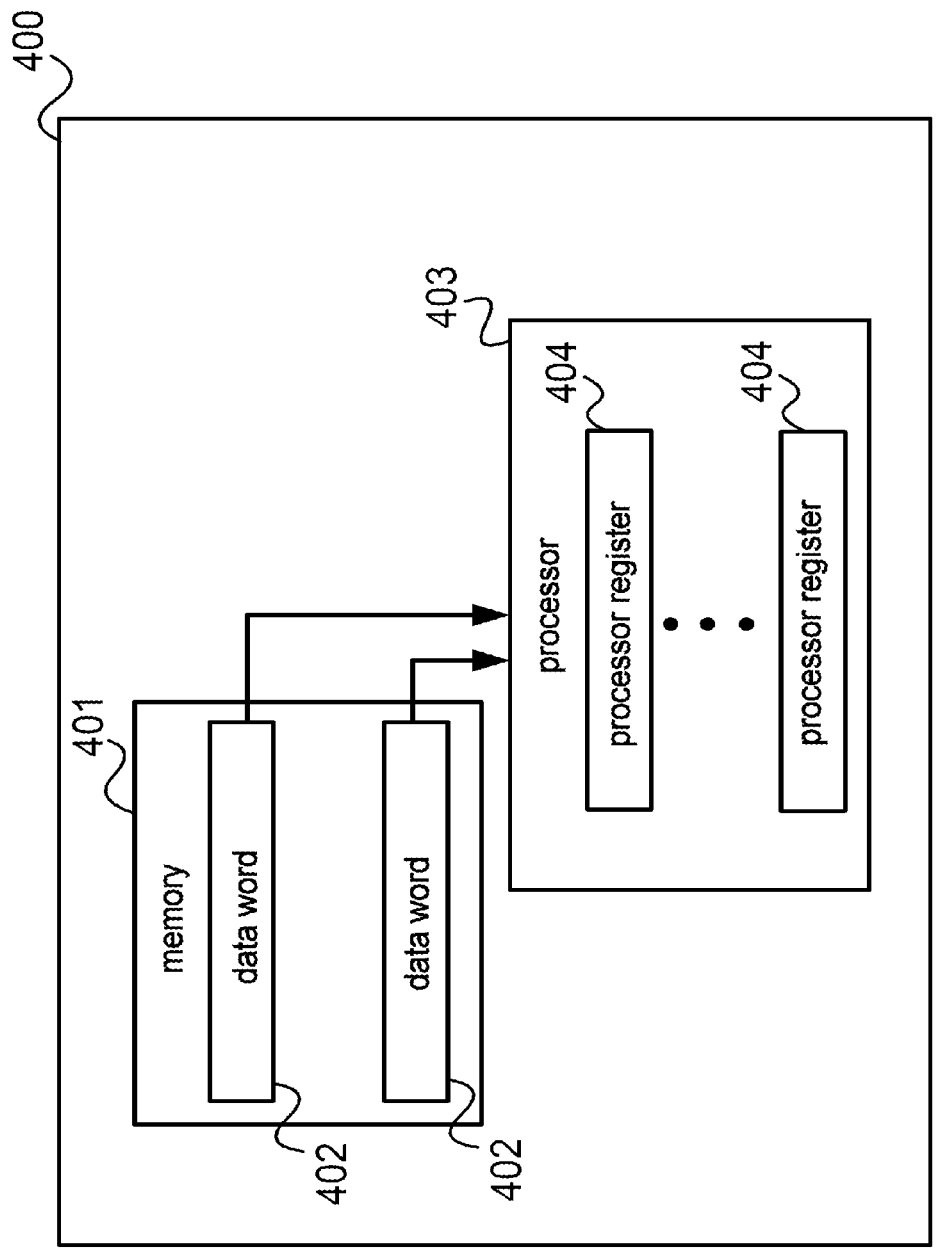
FIG. 4 shows a data processing device according to an embodiment.

In summary, a data processing device as depicted in FIG. 4 is provided according to various embodiments.

FIG. 4 shows a data processing device 400 according to one embodiment.

The data processing device 400 has a memory 401 configured to store secret data that include a plurality of secret data words 402.

The data processing device 400 also has a processor 403 configured to combine a first data word and a second data word of the plurality of secret data words 402.

In this regard, the processor 403 stores, for each of the first data word and the second data word, for an Exclusive-Or sharing of the data word into multiple partial representatives, for at least one of the partial representatives, a transformed version of the partial representative in a processor register 404 (e.g. in a respective processor register, from multiple processor registers 404, for the data word and/or the partial representative).

If the combination of the first data word with the second data word requires a partial representative of the first data word to be combined with a partial representative of the second data word that is stored in a processor register after having been transformed (i.e. with a partial representative for which a transformed version is stored in a processor register), the processor 403 combines the partial representative of the first data word with the partial representative of the second data word by means of a processor operation that takes into consideration that the partial representative of the second data word has been transformed.

According to various exemplary embodiments, in other words a masking of a data word, i.e. an Exclusive-Or sharing into multiple partial words (i.e. partial representatives, referred to as "shares"), results in at least one partial representative being transformed before it is stored in a processor register. Such a data word is then used for computation by means of atomic processor operations (from the instruction set of the processor) that allow the operation to be balanced for one (or else both) operands. Using such a type of operations avoids a partial representative needing to be transformed back before an operation. The reason is that this would lead to the partial representative sometimes being present in a register in untransformed form, which would render it attackable e.g. in the event of an interrupt that leads to register contents being stored ("register dump").

The approach in FIG. 4 allows a considerable reduction of leaks of information to be achieved in the event of side channel attacks. This can be achieved without additional implementation costs. It can also be combined with other measures, such as "hiding", for example by means of dummy operations, in order to achieve even more secure implementations. Additionally, robustness against higher-order attacks is increased.

It is also possible for multiple partial representatives of a data word to be stored in processor registers after having been transformed, in which case different transformations are used for different partial representatives (e.g. rotations by different numbers of bit positions).

The processor operation receives its operands from the processor registers, that is to say a partial representative of the first data word from a first processor register and a partial representative of the second data word from a second processor register.

It should be kept in mind that the approach described can be employed for any Boolean masking methods, and the embodiments described above (e.g. for the And function) are only examples. This also applies to the number of partial representatives used and to the order of the masking scheme (i.e. higher-order maskings can also be employed).

According to various embodiments, the transformation is a (reversible) mathematical transformation, e.g. a linear transformation such as for example a bit permutation.

By way of example, a method as depicted in FIG. 5 is performed.

FIG. 5 shows a flowchart 500 illustrating a method for processing secret data according to an embodiment.

For each data word of a first data word and a second data word from secret data, in 501 the data word is broken down into multiple partial representatives according to an Exclusive-Or sharing of the data word, in 502 at least one of the partial representatives is transformed to produce a transformed version of the partial representative, and in 503, for the at least one of the partial representatives, the transformed version of the partial representative is stored in a processor register. 501 and 502 can also be performed together, i.e. for example do not need to be separated into different operations or instructions.

In 504 the first data word and the second data word are combined, wherein, if the combination of the first data word with the second data word requires a partial representative of the first data word to be combined with a partial representative of the second data word that is stored in a processor register after having been transformed, the partial representative of the first data word is combined with the partial representative of the second data word by means of a processor operation that takes into consideration that the partial representative of the second data word has been transformed.

Various exemplary embodiments are indicated below.

Exemplary embodiment 1 is a data processing device as described with reference to FIG. 4.

Exemplary embodiment 2 is the data processing device according to exemplary embodiment 1, wherein the processor operation include the back transformation of the transformation of the second data word as a component.

Exemplary embodiment 3 is the data processing device according to exemplary embodiment 1 or 2, wherein the secret data include a cryptographic key.

Exemplary embodiment 4 is the data processing device according to exemplary embodiment 3, wherein the processor is configured to perform a program for performing a cryptographic operation by means of the cryptographic key and to perform the processor operation as part of the program.

Exemplary embodiment 5 is the data processing device according to exemplary embodiment 4, wherein the cryptographic operation is decryption or signing of further data to be cryptographically processed or key generation.

Exemplary embodiment 6 is the data processing device according to one of exemplary embodiments 1 to 5, wherein the processor operation is a Boolean basic function having two operands.

Exemplary embodiment 7 is the data processing device according to one of exemplary embodiments 1 to 6, wherein the processor operation is a Boolean And operation, a Boolean Or operation, a Boolean Nand operation, a Boolean Nor operation or a Boolean Exclusive-Or operation.

Exemplary embodiment 8 is the data processing device according to one of exemplary embodiments 1 to 7, wherein the transformation is a bit-by-bit cyclic rotation.

Exemplary embodiment 9 is the data processing device according to one of exemplary embodiments 1 to 8, wherein the transformation is a bit-by-bit cyclic rotation through a stipulated number of bit positions that is coprime to the word length of the secret data words.

Exemplary embodiment 10 is the data processing device according to one of exemplary embodiments 1 to 9, wherein the processor operation is an operation from the instruction set of the processor.

Exemplary embodiment 11 is the data processing device according to one of exemplary embodiments 1 to 10, wherein the processor is a RISC processor.

Exemplary embodiment 12 is the data processing device according to one of exemplary embodiments 1 to 11, wherein the processor is an ARM processor.

Exemplary embodiment 13 is the data processing device according to one of exemplary embodiments 1 to 12, wherein the processor operation leaves the content of the processor register in which the partial representative of the second data word is stored unchanged or replaces it with the result of the combination of the partial representative of the first data word with the partial representative of the second data word.

Exemplary embodiment 14 is the data processing device according to one of exemplary embodiments 1 to 13, wherein the processor is configured so as, for each of the first data word and the second data word, for an Exclusive-Or sharing of the data word into multiple partial representatives, to store, for all or all but one of the partial representatives, a transformed version of the partial representative in a processor register.

Exemplary embodiment 15 is the data processing device according to one of exemplary embodiments 1 to 14, wherein the processor is configured so as, for each of the first data word and the second data word, to store, for partial representatives of the data word, transformed versions in processor registers, wherein the transformed versions are produced according to different transformations.

Exemplary embodiment 16 is the data processing device according to one of exemplary embodiments 1 to 15, wherein the memory stores the secret data words in the form of Exclusive-Or shares.

Exemplary embodiment 17 is the data processing device according to one of exemplary embodiments 1 to 16, wherein the memory is configured to store the secret data words in the form of Exclusive-Or shares, wherein for each data word, for at least one partial representative, a transformed version of the partial representative is stored.

Exemplary embodiment 18 is the data processing device according to one of exemplary embodiments 1 to 15, wherein the processor is configured so as, for each of the first data word and the second data word, to produce the Exclusive-Or sharing and/or to transform the at least one partial representative to produce the transformed version of the partial representative.

Exemplary embodiment 19 is the data processing device according to one of exemplary embodiments 1 to 18, wherein the processor is configured so as, if the combination of the first data word with the second data word requires a partial representative of the first data word to be combined with a partial representative of the second data word that is stored in a processor register after having been transformed, and the partial representative of the first data word is stored in a processor register after having been transformed, to combine the partial representative of the first data word with the partial representative of the second data word by means of a processor operation that takes into consideration that the partial representative of the first data word and the partial representative of the second data word have been transformed.

Exemplary embodiment 20 is a method as described with reference to FIG. 5.

Exemplary embodiment 21 is the method according to exemplary embodiment 20, wherein the processor operation includes the back transformation of the transformation of the second data word as a component.

Exemplary embodiment 22 is the method according to exemplary embodiment 20 or 21, wherein the secret data include a cryptographic key.

Exemplary embodiment 23 is the method according to exemplary embodiment 22, involving performing a program for performing a cryptographic operation by means of the cryptographic key and performing the processor operation as part of the program.

Exemplary embodiment 24 is the method according to exemplary embodiment 23, wherein the cryptographic operation is decryption or signing of further data to be cryptographically processed or key generation.

Exemplary embodiment 25 is the method according to one of exemplary embodiments 20 to 24, wherein the processor operation is a Boolean basic function having two operands.

Exemplary embodiment 26 is the method according to one of exemplary embodiments 20 to 25, wherein the processor operation is a Boolean And operation, a Boolean Or operation, a Boolean Nand operation, a Boolean Nor operation or a Boolean Exclusive-Or operation.

Exemplary embodiment 27 is the method according to one of exemplary embodiments 20 to 26, wherein the transformation is a bit-by-bit cyclic rotation.

Exemplary embodiment 28 is the method according to one of exemplary embodiments 20 to 27, wherein the transformation is a bit-by-bit cyclic rotation through a stipulated number of bit positions that is coprime to the word length of the secret data words.

Exemplary embodiment 29 is the method according to one of exemplary embodiments 20 to 28, wherein the combination of the first data word with the second data word is performed by a processor and the processor operation is an operation from the instruction set of the processor.

Exemplary embodiment 30 is the method according to one of exemplary embodiments 20 to 29, wherein the combination of the first data word with the second data word is performed by an RISC processor.

Exemplary embodiment 31 is the method according to one of exemplary embodiments 20 to 30, wherein the combination of the first data word with the second data word is performed by an ARM processor.

Exemplary embodiment 32 is the method according to one of exemplary embodiments 20 to 31, wherein the processor operation leaves the content of the processor register in which the partial representative of the second data word is stored unchanged or replaces it with the result of the combination of the partial representative of the first data word with the partial representative of the second data word.

Exemplary embodiment 33 is the method according to one of exemplary embodiments 20 to 32, involving, for each of the first data word and the second data word, for an Exclusive-Or sharing of the data word into multiple partial representatives, storing, for all or all but one of one of the partial representatives, a transformed version of the partial representative in a processor register.

Exemplary embodiment 34 is the method according to one of exemplary embodiments 20 to 33, involving, for each of the first data word and the second data word, storing, for partial representatives of the data word, transformed versions in processor registers, wherein the transformed versions are produced according to different transformations.

Exemplary embodiment 35 is the method according to one of exemplary embodiments 20 to 34, involving storing the secret data words in the form of Exclusive-Or sharing in a memory.

Exemplary embodiment 36 is the method according to one of exemplary embodiments 20 to 35, involving storing the secret data words in the form of Exclusive-Or sharing in a memory, wherein for each data word, for at least one partial representative, a transformed version of the partial representative is stored.

Exemplary embodiment 37 is the method according to one of exemplary embodiments 20 to 34, wherein the combination of the first data word with the second data word is performed by a processor, and the processor, for each of the first data word and the second data word, produces the Exclusive-Or sharing and/or transforms the at least one partial representative to produce the transformed version of the partial representative.

Exemplary embodiment 38 is the method according to one of exemplary embodiments 20 to 37, involving, if the combination of the first data word with the second data word requires a partial representative of the first data word to be combined with a partial representative of the second data word that is stored in a processor register after having been transformed, and the partial representative of the first data word is stored in a processor register after having been transformed, combining the partial representative of the first data word with the partial representative of the second data word by means of a processor operation that takes into consideration that the partial representative of the first data word and the partial representative of the second data word have been transformed.

Although the invention has been shown and described primarily with reference to specific embodiments, those familiar with the specialist area should understand that numerous changes thereto can be made in respect of embodiment and details without departing from the essence and scope of the invention as defined by the claims that follow. The scope of the invention is therefore determined by the appended claims, and the intention is for all changes that come under the literal sense or the scope of equivalence of the claims to be covered.

LIST OF REFERENCE SIGNS 100 processing device
101 CPU
102 RAM
103 nonvolatile memory
104 crypto module
105 bus
106 analog module
107 input/output interface
108-111 crypto cores
112 hardware random number generator
200 data processing arrangement
201 processor
202 secret data word
203 masking block
204 partial representative
205 further data to be cryptographically processed
206 processor register
300 data processing arrangement
301 processor
302 secret data word
303 masking block
304 partial representative
305 further data to be cryptographically processed
306, 307 processor register
308 transformation block
309 ALU
400 data processing device
401 memory
402 secret data words
403 processor
404 processor register
500 flowchart
501-504 flowchart steps

The invention claimed is:

1. A device for protection against a side-channel attack during performance of a cryptographic operation, including an encryption operation, decryption operation, and/or authentication operation, comprising:
   a memory configured to store secret data that contain a plurality of secret data words;
   a processor configured to perform the cryptographic operation by combining a first data word and a second data word of the plurality of secret data words by storing, for each of the first data word and the second data word,
   for an Exclusive-Or sharing of the data word into multiple partial representatives, and for at least one of the partial representatives, a transformed version of the partial representative in a processor register; and,
   if the combination of the first data word with the second data word requires a partial representative of the first data word to be combined with a partial representative of the second data word that is stored in a processor register after having been transformed, the cryptographic operation further comprises the processor combining the partial representative of the first data word with the partial representative of the second data word by means of a processor operation that takes into consideration that the partial representative of the second data word has been transformed.

2. The device as claimed in claim 1, wherein the processor operation comprises the back transformation of the transformation of the second data word as a component.

3. The device as claimed in claim 1, wherein the secret data comprise a cryptographic key.

4. The device as claimed in claim 3, wherein the processor is configured to perform a program for performing a cryptographic operation by means of the cryptographic key and to perform the processor operation as part of the program.

5. The device as claimed in claim 4, wherein the cryptographic operation is decryption or signing of further data to be cryptographically processed or key generation.

6. The device as claimed in claim 1, wherein the processor operation is a Boolean basic function having two operands.

7. The device as claimed in claim 1, wherein the processor operation is a Boolean And operation, a Boolean Or operation, a Boolean Nand operation, a Boolean Nor operation or a Boolean Exclusive-Or operation.

8. The device as claimed in claim 1, wherein the transformation is a bit-by-bit cyclic rotation.

9. The device as claimed in claim 1, wherein the transformation is a bit-by-bit cyclic rotation through a stipulated number of bit positions that is coprime to the word length of the secret data words.

10. The device as claimed in claim 1, wherein the processor operation is an operation from the instruction set of the processor.

11. The device as claimed in claim 1, wherein the processor is a RISC processor.

12. The device as claimed in claim 1, wherein the processor is an ARM processor.

13. The device as claimed in claim 1, wherein the processor operation leaves the content of the processor register in which the partial representative of the second data word is stored unchanged or replaces it with the result of the combination of the partial representative of the first data word with the partial representative of the second data word.

14. The device as claimed in claim 1, wherein the processor is configured so as, for each of the first data word and the second data word,
for an Exclusive-Or sharing of the data word into multiple partial representatives, to store, for all or all but one of the partial representatives, a transformed version of the partial representative in a processor register.

15. The device as claimed in claim 1, wherein the processor is configured so as, for each of the first data word and the second data word, to store, for partial representatives of the data word, transformed versions in processor registers, wherein the transformed versions are produced according to different transformations.

16. The device as claimed in claim 1, wherein the memory stores the secret data words in the form of Exclusive-Or shares.

17. The device as claimed in claim 1, wherein the memory is configured to store the secret data words in the form of Exclusive-Or shares, wherein for each data word, for at least one partial representative, a transformed version of the partial representative is stored.

18. The device as claimed in claim 1, wherein the processor is configured so as, for each of the first data word and the second data word, to produce the Exclusive-Or sharing and/or to transform the at least one partial representative to produce the transformed version of the partial representative.

19. The device as claimed in claim 1, wherein the processor is configured so as, if the combination of the first data word with the second data word requires a partial representative of the first data word to be combined with a partial representative of the second data word that is stored in a processor register after having been transformed, and the partial representative of the first data word is stored in a processor register after having been transformed, to combine the partial representative of the first data word with the partial representative of the second data word by means of a processor operation that takes into consideration that the partial representative of the first data word and the partial representative of the second data word have been transformed.

20. A method of processing secret data by a computing device for protection against a side-channel attack during performance of a cryptographic operation including an encryption operation, a decryption operation, and/or an authentication operation, the method comprising:
during the cryptographic operation and for each data word of a first data word and a second data word from the secret data,
breaking down, by the computing device, the data word into multiple partial representatives according to an Exclusive-Or sharing of the data word;
transforming, by the computing device, at least one of the partial representatives to produce a transformed version of the partial representative;
storing, by the computing device, for the at least one of the partial representatives, the transformed version of the partial representative in a processor register; and
combining, by the computing device, the first data word and the second data word, involving, if the combination of the first data word with the second data word requires a partial representative of the first data word to be combined with a partial representative of the second data word that is stored in a processor register after having been transformed, combining the partial representative of the first data word with the partial representative of the second data word by means of a processor operation that takes into consideration that the partial representative of the second data word has been transformed.

* * * * *